United States Patent
Nakada et al.

(10) Patent No.: US 8,324,829 B2
(45) Date of Patent: Dec. 4, 2012

(54) STARTUP CONTROL FOR A HIGH PRESSURE DISCHARGE LAMP BALLAST

(75) Inventors: Katsuyoshi Nakada, Kyoto (JP); Tomoyuki Nakano, Osaka (JP); Koji Watanabe, Kyoto (JP)

(73) Assignee: Panasonic Corporation, Osaka (JP)

( * ) Notice: Subject to any disclaimer, the term of this patent is extended or adjusted under 35 U.S.C. 154(b) by 280 days.

(21) Appl. No.: 12/694,099

(22) Filed: Jan. 26, 2010

(65) Prior Publication Data
US 2010/0194302 A1   Aug. 5, 2010

(30) Foreign Application Priority Data
Jan. 26, 2009   (JP) .................................. 2009-014749

(51) Int. Cl.
*H05B 37/00* (2006.01)
*H05B 41/295* (2006.01)

(52) U.S. Cl. ........................................ 315/291; 315/224

(58) Field of Classification Search .................. 315/291, 315/307, 224, 209 R, DIG. 4, DIG. 2, DIG. 5, 315/DIG. 7
See application file for complete search history.

(56) References Cited

U.S. PATENT DOCUMENTS

| | | | | |
|---|---|---|---|---|
| 5,170,099 A | * | 12/1992 | Ueoka et al. ................... | 315/291 |
| 7,378,804 B2 | * | 5/2008 | Mitsuyasu et al. ............. | 315/247 |
| 7,394,209 B2 | * | 7/2008 | Lin et al. ........................ | 315/247 |
| 7,436,123 B2 | * | 10/2008 | Hamamoto et al. ........... | 315/219 |

FOREIGN PATENT DOCUMENTS
WO   WO03039206   5/2003

* cited by examiner

*Primary Examiner* — Minh D A
(74) *Attorney, Agent, or Firm* — Waddey & Patterson, P.C.; Mark J. Patterson; Gary L. Montle

(57) ABSTRACT

A high pressure discharge lamp ballast is provided with a control operation for stable transition from a lamp ignition mode into a preheating mode. An inverter is coupled across a DC source and has a plurality of switching elements coupled to the high pressure discharge lamp. A series resonant LC circuit is coupled to the inverter outputs and to the high pressure discharge lamp. A control circuit is coupled to the switching elements and configured to control switching operation. An ignition mode has one or more time periods during each of which a driving frequency of the switching elements is swept through a predetermined range of frequencies and then controlled at a first driving frequency less than the predetermined range of frequencies. A preheating mode follows wherein the switching elements are controlled at a second driving frequency less than the predetermined range of frequencies.

14 Claims, 11 Drawing Sheets

STARTUP CONTROL FOR A HIGH PRESSURE DISCHARGE LAMP BALLAST

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of the following patent application(s) which is/are hereby incorporated by reference: Japan Patent Application No. 2009-014749, filed Jan. 26, 2009.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates to electronic ballasts for high pressure discharge lamps, such as high pressure mercury lamps and metal halide lamps, an illumination fixture using lamps powered by such a ballast, and a light source for a projector.

FIG. 1 is a circuit diagram showing a basic configuration for a high pressure discharge lamp ballast. A voltage supplied from a DC power source 1 is stepped down by a buck converter 2 whose output is converted into a rectangular wave AC voltage by an inverter (polarity inversion) circuit 3. A high voltage is generated for lamp ignition by a resonant circuit 4 which is connected to an output of the inverter circuit 3 and includes a capacitor C2 and an inductor L2. A voltage detection circuit 5 detects a voltage applied to a high pressure discharge lamp La.

To ignite a high voltage discharge lamp using such a high pressure discharge lamp ballast, pairs of switching elements Q2 and Q5 and switching elements Q3 and Q4 arranged in respective positions diagonal from each other in the inverter circuit 3 are turned on/off alternately at a high frequency to generate a high frequency voltage in a range from several tens kHz to several hundreds kHz across the resonant circuit 4. This high frequency voltage is boosted by a resonance action of the resonant circuit 4, sweeping a driving frequency in the switching elements Q2 to Q5 until the capacitor C2 is allowed to reach a desired voltage, followed by fixing a driving frequency to maintain and generate a high voltage when a desired high pressure resonance voltage is obtained. This high pressure resonance voltage is then used to cause a breakdown of the high pressure discharge lamp La.

As stated above, to obtain a high resonance voltage for causing a breakdown of the high pressure discharge lamp in the lamp ballast of a resonant-start type, in which a high frequency voltage is applied by the resonant circuit 4 at the time of starting, the inverter circuit 3 is subjected to switching by a resonance frequency (or frequency obtained by multiplying a resonance frequency by one over an odd number) applied to the inductor L2 and the capacitor C2 in the resonant circuit 4. The resonance action is used to generate a starting voltage for the high pressure discharge lamp for a certain period of time. This is called a starting (or ignition) mode Tst.

Thereafter, to promptly preheat one or more lamp filaments, a frequency in the inverter circuit 3 is reduced to a driving frequency which is relatively lower than a driving frequency used for an operation in the ignition mode, whereby the current flowing into the high pressure discharge lamp is increased to preheat the lamp filaments. This is called a preheating mode Tpre.

This preheating mode Tpre is followed by application of a low-frequency rectangular wave voltage to the high pressure discharge lamp for continuous arc discharge, so that lighting of the high pressure discharge lamp is maintained. This is called a normal lighting mode and/or normal mode Tnorm.

FIG. 19 shows temporal changes made in a voltage applied to a high pressure discharge lamp and a driving frequency in an inverter circuit when no breakdown occurs during ignition mode Tst periods. FIG. 20 shows temporal changes made in a voltage applied to the high pressure discharge lamp, a current flowing in the high pressure discharge lamp and a driving frequency in the inverter circuit when a breakdown occurs in the ignition mode Tst periods. In each period of the ignition mode Tst, a voltage is applied to a high pressure discharge lamp La with a frequency which is sufficiently higher than a lighting frequency used in normal lighting, and the pairs of the switching elements Q2 and Q5 and the switching elements Q3 and Q4 of the inverter circuit 3 are subjected to an alternate switching operation at a high frequency.

However, driving the inverter circuit 3 at a relatively high frequency as observed in each period of the ignition mode will result in a high impedance in the load circuit, making it difficult to supply adequate preheat current to the high pressure discharge lamp. Therefore, in each period of the ignition-mode in which a breakdown of the high pressure discharge lamp is triggered, a period of time required to achieve breakdown of the high pressure discharge lamp varies due to individual variations in high pressure discharge lamps, and further depending on temperature and atmospheric pressure of a high pressured discharge lamp resulting from a period of time elapsed from extinguishing of the high pressure discharge lamp to the time of restarting. Therefore, to preheat the lamp filaments, the ignition-mode periods are generally followed by preheating mode periods in which the driving frequency in the inverter circuit is lower than the frequency applied in the ignition mode, thereby reducing impedance in the load circuit with an increase of a current flowing into the high pressure discharge lamp. An operation to cause a high frequency current to flow in a positive/negative symmetrical manner is maintained for a predetermined period of time.

When the preheating mode is complete the process will move on to the normal mode, which refers to each period of the normal lighting mode wherein the pairs of the switching elements Q2 and Q5 and the switching elements Q3 and Q4 are turned on/off alternately at a low frequency to generate a low frequency voltage in a range from several tens Hz to several hundreds Hz across the high pressure discharge lamp to maintain proper lighting.

As stated above, in a control operation carried out by setting a predetermined period of time for an ignition mode to cause a breakdown of a high pressure discharge lamp upon startup, and for the preheating mode to preheat a lamp filament, transition to the preheating mode to appropriately preheat the lamp filament follows completion of the ignition mode and is therefore accompanied by a time lag which occurs in control switching, leaving concern about deterioration in the ability of the lamp to ignite.

In a second conventional example as shown in FIGS. 21 and 22, to secure starting operation even if high pressure discharge lamps having different characteristics caused by manufacturing variations, and the starting voltage is increased at an end-of-life stage thereof, starting control is carried out by alternately turning on/off the pairs of the switching elements Q2 and Q5 and the switching elements Q3 and Q4 in the inverter circuit 3, while sweeping a driving frequency in a predetermined frequency range so as to pass through a resonance point of the resonant circuit 4. Moreover, for the purpose of reducing the size of components which constitute the resonant circuit 4 while obtaining a voltage amplitude which is substantially the same as that obtained in driving the inverter circuit 3 at the above frequency, the frequency obtained by multiplying a resonance frequency by one over an odd number (i.e., $1/(2n+1)$, where n is a whole number) is occasionally set as a driving frequency for use in performing a starting control for the inverter circuit 4. The amplitude of a resonant voltage obtained by such a frequency is tapered as the multiplier is raised, and particularly when the multiplier is set to three times, it is possible to obtain a voltage amplitude which is substantially equivalent to that obtained in driving the inverter circuit 3 at a resonance frequency determined by the inductor L2 connected in series to the high pressure discharge lamp and the capacitor C2 connected in parallel therewith, so that component size reduction in the resonant circuit 4 can be realized.

In comparison with the control technique according to the first conventional example, the second conventional example causes large stresses to the circuit from sweeping a frequency through a resonance point in the ignition mode. However, using a driving frequency obtained by multiplying the resonance frequency in the resonant circuit by one over an odd number such as ⅓ times and ⅕ times make it possible to reduce component stresses while obtaining a substantially similar voltage amplitude.

In the case where lighting of a high pressure discharge lamp is achieved in the ignition mode, current flowing into the high pressure discharge lamp can be effectively increased in comparison with the control technique according to the first conventional example because driving control is performed at a frequency lower than a resonance point (or a point obtained by multiplying a resonance point by one over an odd number). However, even with the control technique according to the second conventional example, it is impossible to sufficiently heat lamp filaments immediately after startup and further improvement of lamp start-up is required.

In an alternative example of a lamp ballast as previously known in the art, and with reference to the basic configuration shown in FIG. 1, it has been proposed that the driving frequency in the inverter circuit 3 at startup is set to a frequency close to a frequency obtained by multiplying a resonance frequency of the resonant circuit 4 by one over an odd number.

As stated above, a high pressure discharge lamp ballast of a resonance activation type generally sets a predetermined period of time, which is about a few seconds for ignition mode periods, in which breakdown of a high pressure discharge lamp is triggered, because a period of time required to achieve breakdown varies among individual high pressure discharge lamps and depends on a temperature and an atmospheric pressure of a high pressure discharge lamp resulting from a period of time elapsed between extinguishing the lamp and restarting. Accordingly, a relatively high driving frequency observed in the periods after achieving a breakdown of the high pressure discharge lamp causes reduction of a current flowing into the high pressure discharge lamp, wherein the high pressure discharge lamp may not be effectively preheated during a period of time before transition to the preheating mode, shutting down the lamp in a worst case and occasionally causing significant stress in the high pressure discharge lamp due to repeated extinguishing and ignition.

BRIEF SUMMARY OF THE INVENTION

A high pressure discharge lamp ballast is provided which is capable of transitioning to a preheating mode in which one or more high pressure discharge lamp filaments can be preheated in an optimal manner, without substantially increasing a period of time allocated for ignition mode periods in which a high voltage is generated, and while avoiding stresses associated with repeated extinguishing and ignition in each period of the ignition mode.

According to the present invention, a frequency lower than that in the preheating mode is applied for relatively short intervals in the ignition mode of a high pressure discharge lamp, thereby enabling transition to the preheating mode to allow appropriate preheating of one or more lamp filaments in each period of the ignition mode, followed by transition to the normal lighting mode to maintain a stable operation.

In an embodiment of the present invention, a high pressure discharge lamp ballast is provided with a control operation for stable transition from a lamp ignition mode into a preheating mode. An inverter is coupled across a DC source and has a plurality of switching elements coupled to the high pressure discharge lamp. A series resonant LC circuit is coupled to the inverter outputs and to the high pressure discharge lamp. A control circuit is coupled to the switching elements and configured to control switching operation. An ignition mode has one or more time periods during each of which a driving frequency of the switching elements is swept through a predetermined range of frequencies and then controlled at a first driving frequency less than the predetermined range of frequencies. A preheating mode follows wherein the switching elements are controlled at a second driving frequency less than the predetermined range of frequencies.

In another embodiment, an illumination fixture includes a high pressure discharge lamp ballast with a DC power source coupled to an inverter circuit. A series resonant circuit including an inductor and a capacitor is coupled to the inverter circuit and to a high pressure discharge lamp. A control circuit configured to control a driving frequency in the inverter circuit is provided with an ignition mode for causing the inverter circuit to apply a high frequency voltage to the high pressure discharge lamp, a preheating mode for preheating one or more lamp filaments after performing the ignition mode, and a normal lighting mode for applying a low-frequency rectangular wave voltage to the high pressure discharge lamp for continuous generation of arc discharge after performing the preheating mode. The ignition mode includes one or more sections or alternating time frames during which a control operation is repeated of sweeping a driving frequency of the switching elements through a predetermined range of frequencies, and further during which a first driving frequency equal to or less than a second driving frequency associated with the preheating mode is applied for a period of time.

In accordance with the present invention, a method of operation is provided for controlling an inverter driving frequency in a high pressure discharge lamp ballast for stable transitioning between operating modes. A first step of the method includes receiving a DC voltage across a pair of input terminals for an inverter having a plurality of switching elements in either a half-bridge or full bridge configuration. A second step includes sweeping a driving frequency for the switching elements through a predetermined range of frequencies during each of one or more time periods in an ignition mode of operation. A third step includes applying a first driving frequency lower than the predetermined range of frequencies during each of the one or more time periods in said ignition mode. A fourth step includes transitioning to a preheating mode of operation after ignition of the lamp, with the preheating mode including a control operation of driving the switching elements at a second driving frequency equal to or greater than the first driving frequency.

DETAILED DESCRIPTION OF THE INVENTION

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

The term "coupled" means at least either a direct electrical connection between the connected items or an indirect connection through one or more passive or active intermediary devices. The term "circuit" means at least either a single component or a multiplicity of components, either active and/or passive, that are coupled together to provide a desired function. The term "signal" means at least one current, voltage, charge, temperature, data or other signal.

The terms "switching element" and "switch" may be used interchangeably and may refer herein to at least: a variety of transistors as known in the art (including but not limited to FET, BJT, IGBT, IGFET, etc.), a switching diode, a silicon controlled rectifier (SCR), a diode for alternating current (DIAC), a triode for alternating current (TRIAC), a mechanical single pole/double pole switch (SPDT), or electrical, solid state or reed relays. Where either a field effect transistor (FET) or a bipolar junction transistor (BJT) may be employed as an embodiment of a transistor, the scope of the terms "gate," "drain," and "source" includes "base," "collector," and "emitter," respectively, and vice-versa.

The terms "power converter" and "converter" unless otherwise defined with respect to a particular element may be used interchangeably herein and with reference to at least DC-DC, DC-AC, AC-DC, buck, buck-boost, boost, half-bridge, full-bridge, H-bridge or various other forms of power conversion or inversion as known to one of skill in the art.

With reference generally to FIGS. 1-16, various embodiments of an electronic ballast and associated control operations for powering a high pressure discharge lamp may be herein described.

Figure 1:
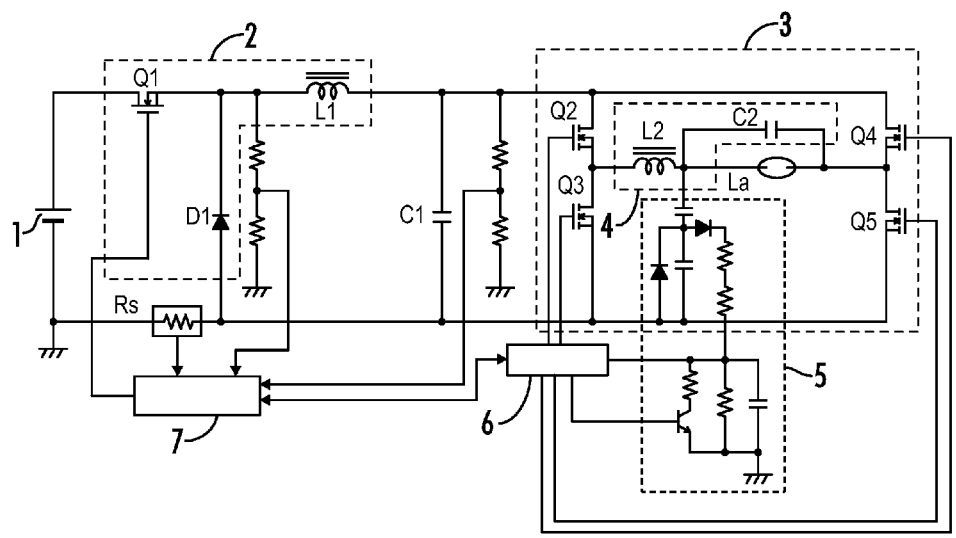
FIG. 1 is a circuit diagram of a high pressure discharge lamp ballast configuration as known in the art, and to which control operations may be applied in accordance with an embodiment of the present invention.

As previously referenced herein, FIG. 1 is a circuit diagram showing an example of a conventionally known high pressure discharge lamp ballast configuration to which various control operations may be applied in accordance with an embodiment the present invention. A DC-DC step-down or buck converter 2 is provided having an input coupled to a DC power source 1 and an output coupled to an inverter circuit 3. A series resonant circuit 4 includes an inductor L2 and a capacitor C2, and is coupled on a first end between switching elements Q2 and Q3 and coupled on a second end between switching elements Q4 and Q5 in the inverter circuit 3. A high pressure discharge lamp La is coupled in parallel with the capacitor C2. A voltage detection circuit 5 is coupled between the inductor L2 and the capacitor C2. The switching elements Q2 to Q5 are turned on/off in accordance with control signals provided by an inverter control circuit 6.

The buck converter 2 is provided with a switching element Q1, an inductor L1 and a diode D1. The switching element Q1 is driven by the control circuit 7 to be turned on/off continuously at a high frequency, whereby an output voltage from the buck converter 2 is charged in the capacitor C1. A current flowing into the switching element Q1 in the buck converter 2 is detected by a current detecting resistor Rs. A resistance voltage dividing circuit detects a DC voltage in the capacitor C1. These detected values are input to a buck converter control circuit 7 for use in controlling an ON time for the switching element Q1. Note that a regenerative current in the diode D1 may also be detected by a resistance voltage dividing circuit for performing switching operations at zero crossings.

The inverter circuit 3 as shown in FIG. 1 is a full bridge circuit for periodically inverting the polarity of the voltage output from the buck converter 2. An AC output from the full bridge circuit is supplied to the high pressure discharge lamp La via the resonant circuit 4.

Figure 2:
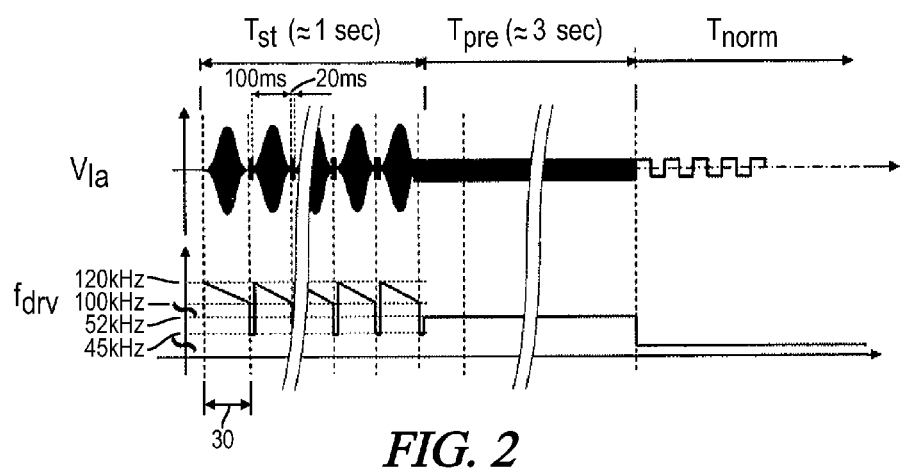
FIG. 2 is a graphical diagram of an example of operation of the embodiment of FIG. 1.
Figure 3:
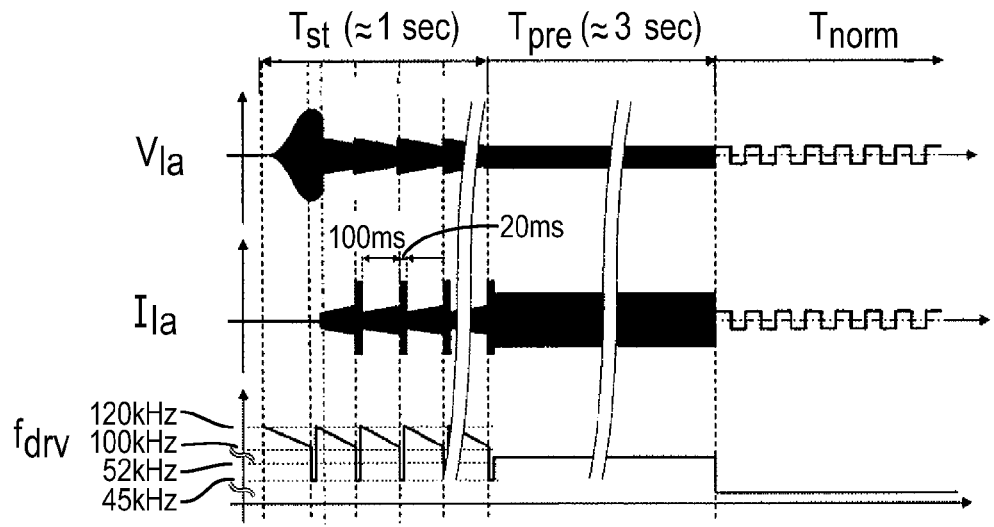
FIG. 3 is a graphical diagram of another example of operation of the embodiment of FIG. 1.

FIG. 2 shows a voltage (Vla) applied to the high pressure discharge lamp La and a driving frequency (fdrv) in the inverter circuit 3 when no breakdown occurs in an ignition mode (Tst). FIG. 3 shows a voltage Vla applied to the high pressure discharge lamp La, a current (Ila) flowing in the high pressure discharge lamp La, and a driving frequency fdrv in the inverter circuit 3 when a breakdown occurs in the ignition mode Tst.

In an embodiment of a control operation described with reference to FIGS. 2 and 3, an ignition or start mode duration is set to about 1 second and a preheating mode duration is set to about three seconds, followed by transition to a normal mode corresponding to usual lighting operation.

To generate a high voltage in the resonant circuit 4, a control operation is performed during each of one or more sections 30 or time periods 30 of the ignition mode Tst by alternately turning on/off pairs of the switching elements Q2 and Q5 and the switching elements Q3 and Q4 in the inverter circuit 3 at a high frequency, controlling a driving frequency fdrv therein to sweep through a frequency range from about 120 kHz to about 100 kHz and including a resonance frequency of the resonant circuit 4, maintaining the high voltage generation for about 100 ms, immediately followed by operating the inverter circuit 3 at a first driving frequency (about 45 kHz) which is lower than a second driving frequency (about 52 kHz) as applied in the preheating mode Tpre for about 20 ms, and repeating this operation in each subsequent section 30 of the ignition mode Tst. The periods of time set above (100 ms and 20 ms) are but one example and may be appropriately set in accordance with a type (i.e., power and size) of high pressure discharge lamp.

When the ignition mode is completed, the second driving frequency and a driving time are set for the inverter circuit 3 so that an optimum current is made to flow to preheat one or more filaments of the high pressure discharge lamp La. In the example shown, a second driving frequency is set to about 52 kHz with a driving time of about 3 seconds in the preheating mode.

Although a first driving frequency of about 45 kHz is applied in each ignition mode section in this example, a first driving frequency of about 52 kHz which is the same as the second driving frequency in the preheating mode also provides a similar effect.

In the ignition mode in which a high voltage is generated during a period thereof, a frequency sweep for about 100 ms is followed by an operation for a short period of time (about 20 ms) at a first driving frequency (for example about 45 kHz) which is lower than a second driving frequency in the preheating mode (for example about 52 kHz), whereby a relatively large current is made to flow for a short period of time, allowing a forced current flow immediately after a breakdown of the high pressure discharge lamp without applying a large stress to the high pressure discharge lamp owing to the short period of time, so that it is possible to overcome an unstable glow state of the high pressure discharge lamp in the ignition mode.

Moreover, for further reduction of circuit stresses, a voltage generated in the resonant circuit 4 in the high pressure discharge lamp ballast as shown in FIG. 1 is detected by the voltage detection circuit 5 to control a driving frequency in the switching elements Q2 to Q5 to remain higher than a resonance frequency of the resonant circuit 4, allowing reduction of electrical and thermal stresses to the switching elements Q2 to Q5 and other components while ensuring a desired starting voltage. An operation performed in the above case is as shown in FIGS. 4 and 5.

Figure 4:
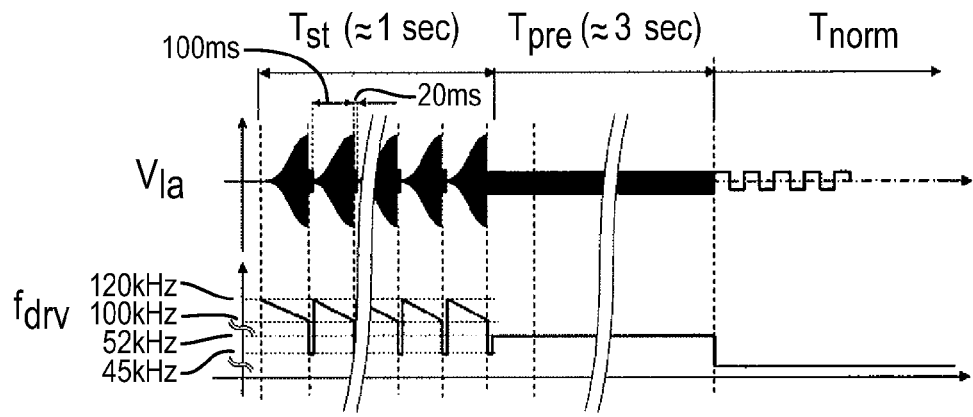
FIG. 4 is a graphical diagram of another example of operation of the embodiment of FIG. 1.
Figure 5:
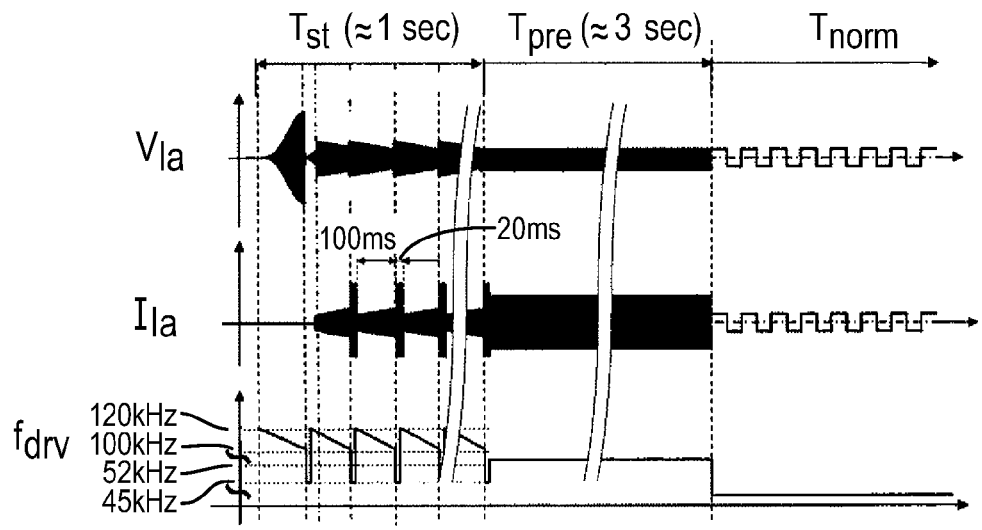
FIG. 5 is a graphical diagram of another example of operation of the embodiment of FIG. 1.

FIG. 4 shows a voltage Vla applied to the high pressure discharge lamp La and a driving frequency fdrv in the inverter circuit 3 when no breakdown occurs in the ignition mode Tst. FIG. 5 shows a voltage Vla applied to the high pressure discharge lamp La, a current Ila flowing in the high pressure discharge lamp La, and a driving frequency fdrv in the inverter circuit 3 when a breakdown occurs in the ignition mode Tst.

Figure 6:
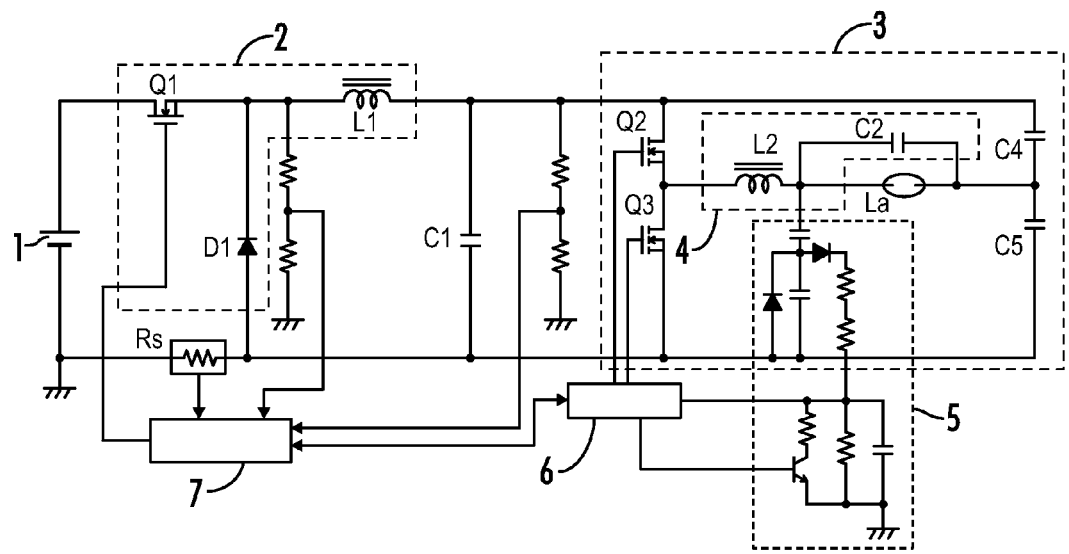
FIG. 6 is a circuit diagram of another embodiment of the present invention.

Referring now to FIG. 6, in an embodiment the switching elements Q4 and Q5 out of the four switching elements Q2 to Q5 shown in FIG. 1 are replaced with capacitors C4 and C5. A control operation applied to the switching elements Q2 and Q3 may be the same as that described above and a similar effect may be obtained. In comparison with the full bridge circuit shown in FIG. 1, a voltage applied to the resonant circuit 4 is halved, but a more inexpensive structure may be realized by a half bridge circuit as shown in FIG. 6 because the switching elements Q4 and Q5 can be omitted.

Figure 7:
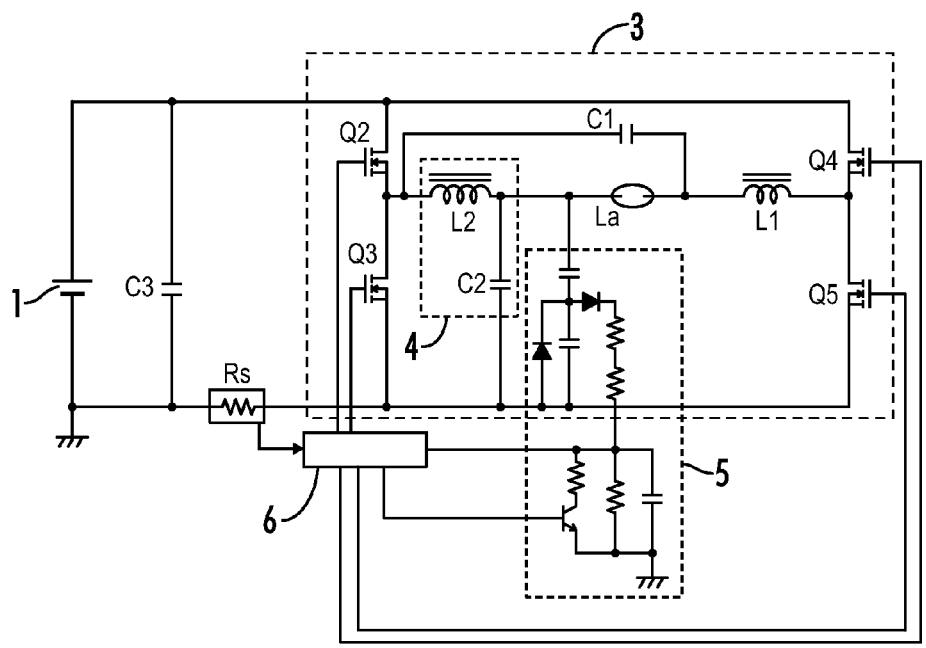
FIG. 7 is a circuit diagram of another embodiment of the present invention.

Referring now to FIG. 7, in an embodiment the inverter circuit 3 may be provided as a step-down chopper circuit 3 including the function of the buck converter 2 as shown in FIG. 1. The inverter circuit 3 of this embodiment is configured to step down the DC power source 1 and convert the resultant voltage amplitude into a rectangular wave AC voltage which is applied to the high pressure discharge lamp La.

The inverter circuit 3 of FIG. 7 includes a low-pass filter circuit made of the inductor L1 and the smoothing capacitor C1 coupled in series between output ends of a full bridge circuit including of four switching elements Q2 to Q5. Coupled across the smoothing capacitor C1 is a series circuit made of the inductor L2 and the high pressure discharge lamp La. A resonant circuit made of the inductor L2 and a capacitor C2 is further coupled across the switching element Q3 for generating and applying a resonance voltage to start and restart the high pressure discharge lamp La in response to a switching operation of the switching elements Q2 to Q5.

Figure 8:
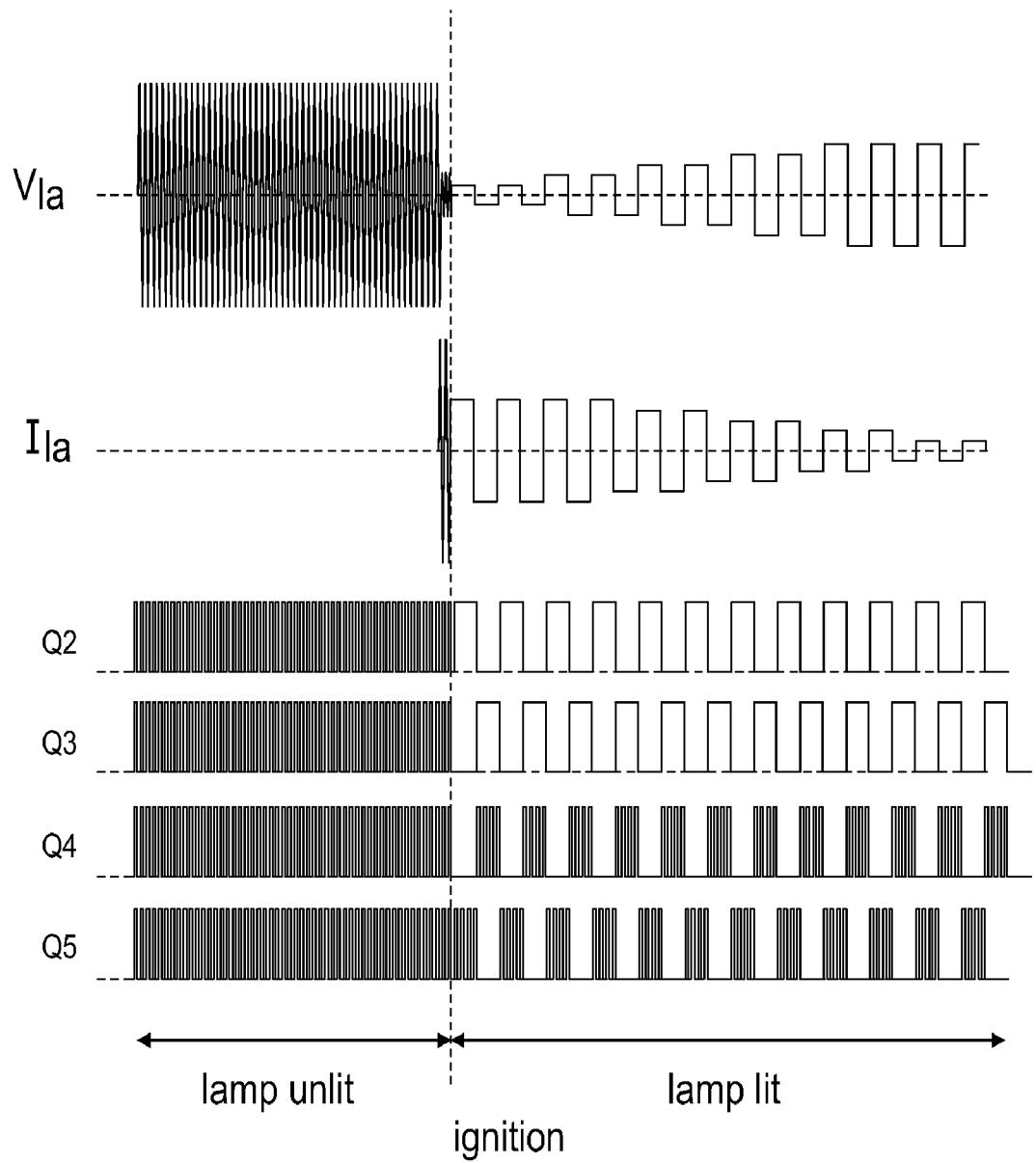
FIG. 8 is a graphical diagram of an example of operation of the embodiment of FIG. 7.

An embodiment as shown in FIG. 7 may be operated as described with reference to FIG. 8. Operation of the inverter circuit 3 during a pre-ignition (lamp unlit) state of the high pressure discharge lamp La is repeated to turn on/off a pair of the switching elements Q2 and Q5 and a pair of the switching elements Q3 and Q4 alternately at a predetermined high driving frequency (about several hundreds kHz for example) so as to generate a high resonance voltage for starting the high pressure discharge lamp La. The inverter circuit 3 may be controlled to operate at a driving frequency which fluctuates with respect to time so that a driving frequency range includes a resonance frequency determined by the inductor L2 and the capacitor C2 in the resonant circuit 4. Alternatively, a driving frequency is controlled to approach a frequency obtained by multiplying a resonance frequency determined by the inductor L2 and the capacitor C2 in the resonant circuit 4 by one over an odd number (i.e. 1/(2n+1), n is a natural number). A control operation is performed so as to set a period of time spent generating a high voltage to about 100 ms, immediately followed by an operation at a frequency lower than a driving frequency applied in the preheating mode periods for about 20 ms, and repeating this operation in each period of the ignition mode. The periods of time set above are but one example and may be appropriately set according to a type (i.e., power and size) of a high pressure discharge lamp.

Completion of the ignition mode is followed by the preheating mode, in which a driving frequency (e.g. about 52 kHz) and a driving time (e.g. about 3 seconds) are set for the inverter circuit 3 so that an optimum current is made to flow and preheat one or more filaments of the high pressure discharge lamp La.

Thereafter, in the normal mode, the switching elements Q2 and Q3 in the inverter circuit 3 are switched alternately at a low driving frequency (about several hundreds Hz). Repeated in the switching elements Q4 and Q5 at this time is a switching operation such that the switching element Q5 is switched at a high frequency (in a range for example from about several tens Hz to about several hundreds Hz) when the switching element Q2 is turned on and the switching element Q4 is switched at a high frequency (in a range for example from about several tens Hz to about several hundreds Hz) when the switching element Q3 is turned on. Owing to this operation, rectangular wave AC power with a frequency of about several hundreds Hz is supplied to the high pressure discharge lamp La.

In an embodiment, an operation as shown in FIGS. 2 to 5 is performed with respect to the ballast of FIG. 7 in the ignition mode such that the inverter circuit 3 performs a high frequency sweep in a range from about 120 kHz to 100 kHz and this operation is maintained for about 100 ms, which is immediately followed by applying a first predetermined driving frequency (about 45 kHz) in the inverter circuit 3 for about 20 ms, repeatedly applying the first predetermined driving frequency for the remainder of the about 1 second allocated for the ignition mode, after which the inverter circuit 3 operates at a second predetermined driving frequency in the preheating mode (about 52 kHz) for about 3 seconds. Although a frequency of about 45 kHz is applied in each ignition period, a frequency of about 52 kHz which is similar to that in the preheating mode can also provide a similar effect.

In such an embodiment, each section of the ignition mode for generating a high voltage may also include an operation performed for a short period of time (about 20 ms) to follow a high voltage generating period of about 100 ms at a driving frequency (about 45 kHz) which is lower than that in the preheating mode. A relatively large current can be made to flow for the short period of time and a forced current flow is realized immediately after a breakdown of the high pressure discharge lamp without applying excessive stresses to the high pressure discharge lamp due to the short period of time, so that it is possible to overcome an unstable glow state of a high pressure discharge lamp in the ignition mode.

Figure 9:
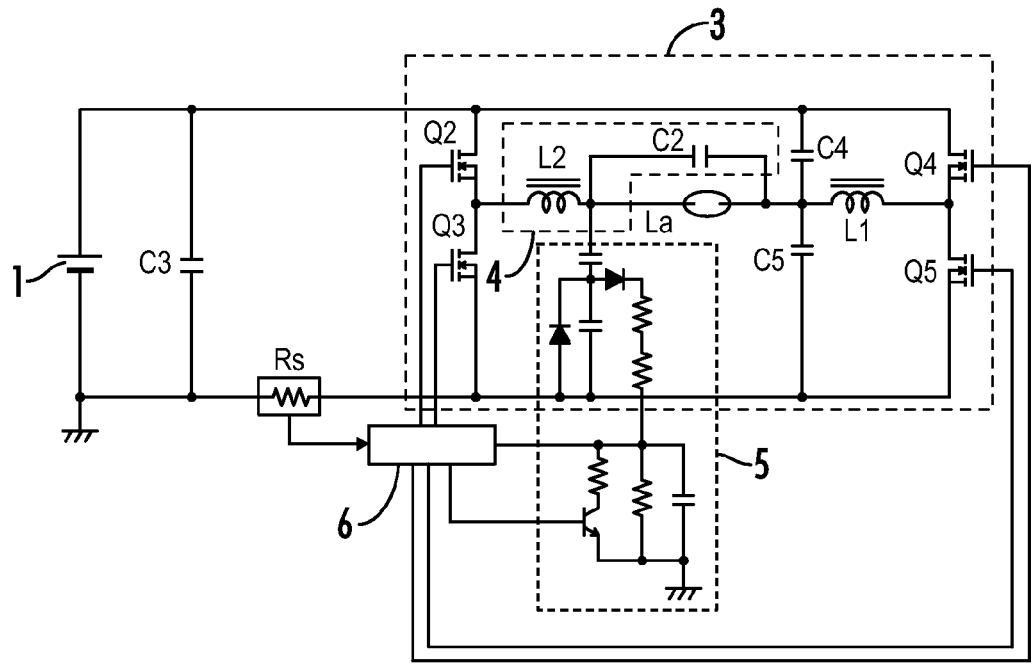
FIG. 9 is a circuit diagram of another embodiment of the present invention.

Referring now to FIG. 9, in an embodiment the smoothing capacitor C1 in FIG. 7 may be replaced with a smoothing capacitor C4 coupled in parallel with the switching element Q4 and the inductor L1, and a smoothing capacitor C5 which is also coupled in parallel with the switching element Q5 and the inductor L1. The resonant circuit 4 which is made of the series circuit including the inductor L2 and the capacitor C2 is coupled between a connection point of the switching elements Q2 and Q3 and a connection point of the capacitors C4 and C5. Even with such a configuration, a similar effect to that previously described may be obtained by applying a similar control operation to drive the switching elements Q2 to Q5 of the inverter circuit 3.

Figure 10:
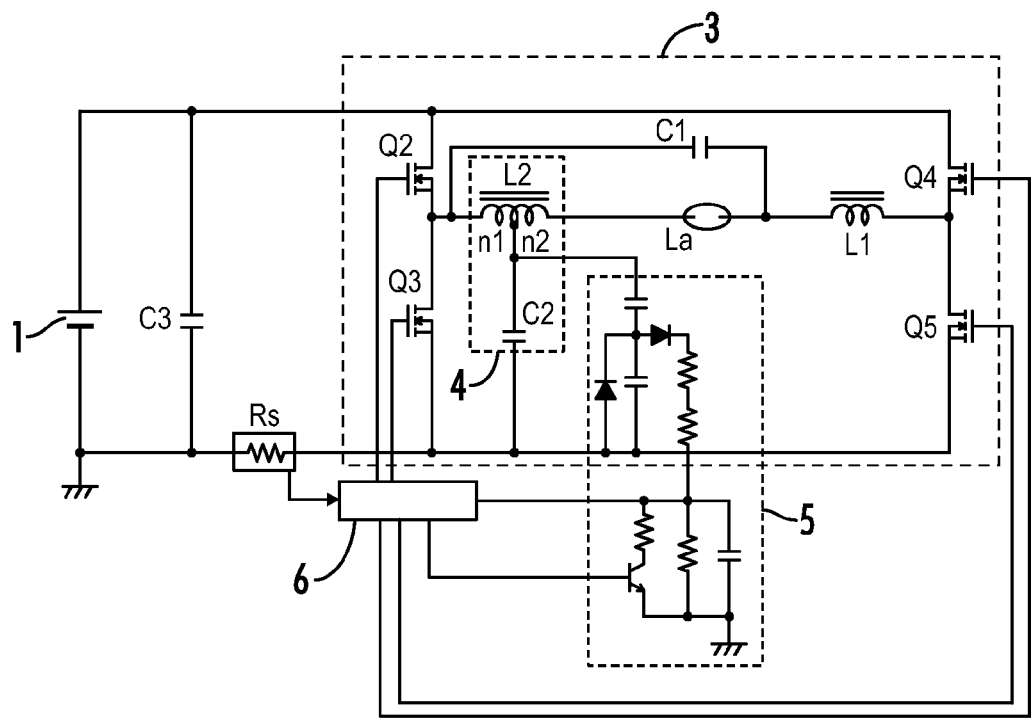
FIG. 10 is a circuit diagram of another embodiment of the present invention.

An embodiment as shown in FIG. 10 differs from the embodiment of FIG. 7 in that the resonant inductor L2 has an autotransformer configuration with a primary winding n1 and a secondary winding n2. The primary winding n1 of the inductor L2 and the resonant capacitor C2 are coupled across the switching element Q3. The secondary winding n2 is positioned between the resonant capacitor C2 and the high pressure discharge lamp La. A turns ratio N is set for the primary winding n1 and the secondary winding n2 to realize an additive polarity and a high voltage obtained in the primary winding n1 by boosting a resonance voltage is applied to the high pressure discharge lamp La.

In a pre-ignition (unlit) state of the high pressure discharge lamp, a control operation may be performed on the inverter circuit 3 to fluctuate a driving frequency with respect to time to approach a resonant frequency determined by the primary winding n1 of the inductor L2 and the capacitor C2 in the resonant circuit 4 or a frequency obtained by multiplying a resonant frequency by one over an odd number (i.e. $1/(2n+1)$, n is a natural number) at some point in time within the range of frequency fluctuations. Other configurations and operations for the embodiment shown in FIG. 10 may be the same as those described with respect to the circuit shown in FIG. 7.

Figure 11:
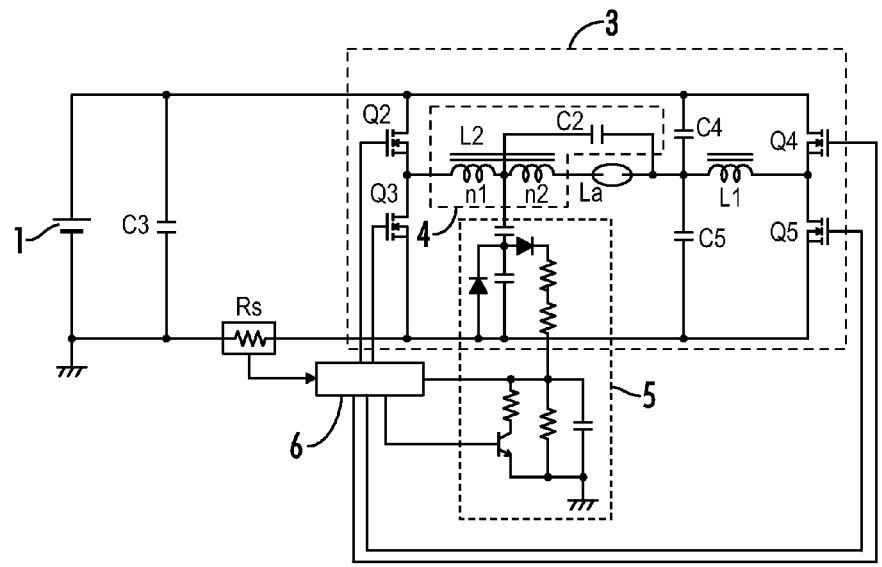
FIG. 11 is a circuit diagram of another embodiment of the present invention.

Referring now to FIG. 11, an embodiment differs from the configuration shown in FIG. 9 in that the resonant inductor L2 is configured as an autotransformer having a primary winding n1 and a secondary winding n2. A series resonant circuit made of the primary winding n1 of the inductor L2 and the capacitor C2 is connected on a first end between the switching elements Q2 and Q3 and on a second end between the capacitors C4 and C5. The secondary winding n2 is positioned between the resonant capacitor C2 and the high pressure discharge lamp La. The primary winding n1 and the secondary winding n2 are wound to realize an additive polarity, and a high voltage obtained in the primary winding n1 by boosting a resonance voltage is applied to the high pressure discharge lamp La. Other structures and operations with respect to the embodiment shown in FIG. 11 may be similarly realized as for those previously described with respect to the embodiment shown in FIG. 9.

Figure 12:
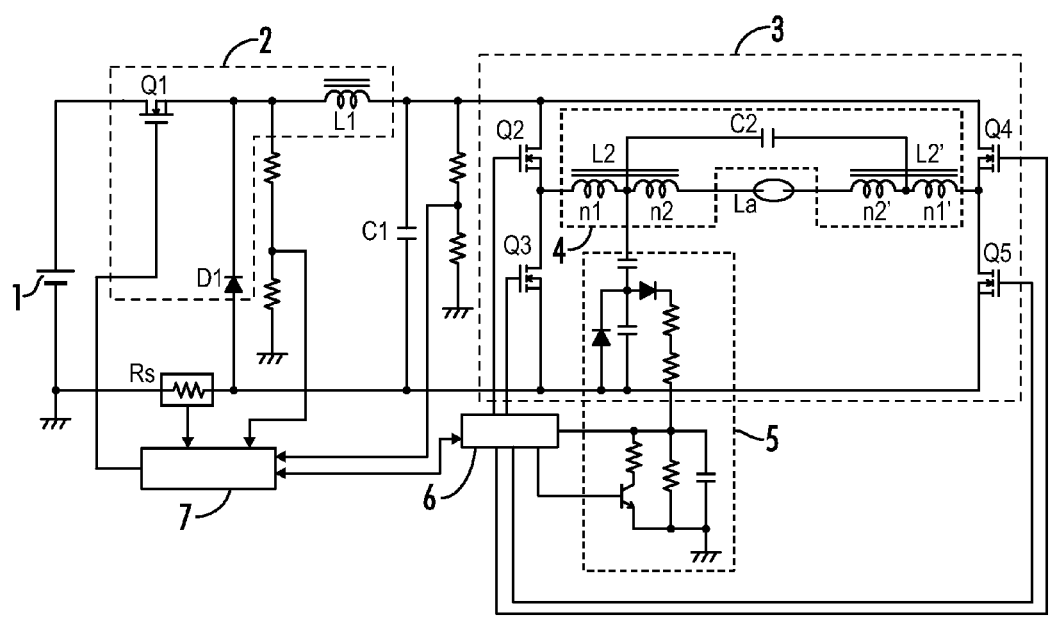
FIG. 12 is a circuit diagram of another embodiment of the present invention.

Referring now to FIG. 12, an embodiment differs from the embodiment shown in FIG. 1 in that the resonant circuit 4 includes two inductors configured as autotransformers. The primary winding n1 of the first inductor L1 is coupled to a node between the switching elements Q2 and Q3 and a primary winding n1' of a second inductor L2' is coupled to a node between the switching elements Q4 and Q5. A series circuit made of the primary winding n1 of the inductor L2, the resonant capacitor C2 and the primary winding n1' of the inductor L2' is coupled on a first end to the node between the switching elements Q2 and Q3 and on a second end to the node between the switching elements Q4 and Q5. Secondary windings n2 and n2' arranged in the inductors L2 and L2' respectively are also connected in series with the high pressure discharge lamp La so as to constitute a closed circuit including the high pressure discharge lamp La, the secondary windings n2 and n2' and the resonant capacitor C2. Other configurations and operations with respect to the embodiment shown in FIG. 12 may be similarly realized as for those previously described with respect to the embodiment shown in FIG. 1.

Figure 13:
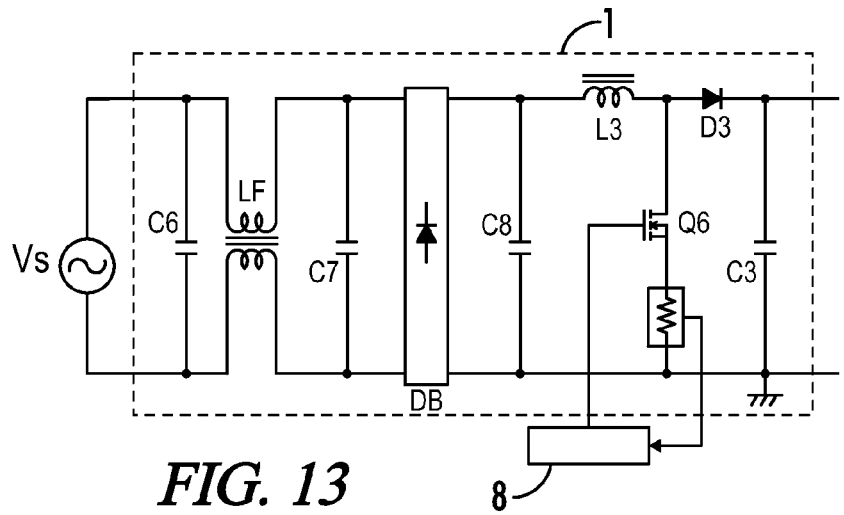
FIG. 13 is a circuit diagram showing an example of a DC power source for use in the present invention.

Referring now to FIG. 13, in various embodiments of the invention the DC power source 1 may include a diode bridge DB for full-wave rectification of a signal received from a commercial AC power source Vs, and a step-up chopper circuit (or boost chopper circuit as further known in the art) for generating a DC voltage based on the rectified voltage received from the diode bridge DB. The step-up chopper circuit includes the switching element Q6, the inductor L3 and the diode D3. An AC line filter LF and capacitors C6 and C7 constitute a filter circuit for noise prevention. A capacitor C8 is used for high frequency bypass, and the diode bridge DB outputs a pulsating voltage. A control circuit 8 controls the step-up chopper circuit so as to charge a capacitor C3 with a boosted smooth DC voltage while improving an input power factor by turning on/off the switching element Q6 at a high frequency. Note that the DC power source 1 is not limited to the configuration exemplified in FIG. 13 and may also be realized by various equivalent configurations as known in the art for providing a DC voltage.

Although various embodiments of circuit configurations have been described herein, the lamp ballast control operation as previously described in accordance with the present invention is provided to power a high pressure discharge lamp using a resonant circuit to apply a high frequency voltage at the time of ignition of the high pressure discharge lamp without any explicit limitation on a form of the ballast circuitry, wherein lamp start-up is improved by sweeping a driving frequency in the inverter circuit within a predetermined frequency range during various sections in an ignition mode and applying for some period of time within each ignition mode section a first driving frequency that is lower than a second driving frequency applied in each section of the preheating mode.

Figure 14:
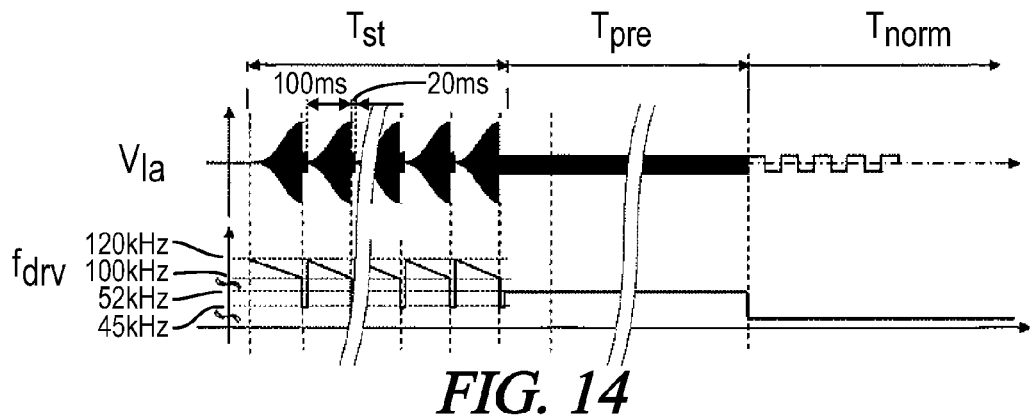
FIG. 14 is a graphical diagram showing another embodiment of operation of the present invention.
Figure 15:
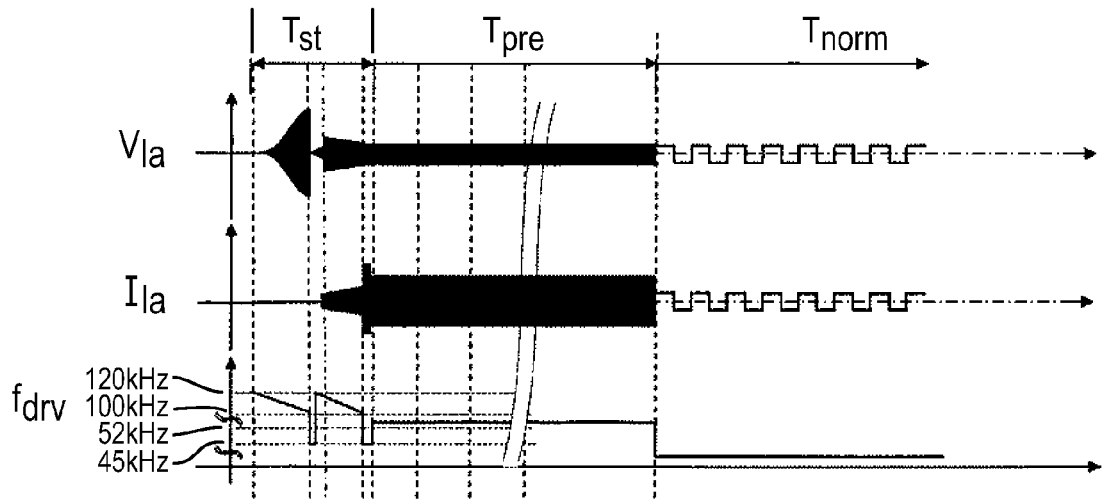
FIG. 15 is a graphical diagram showing an alternative operation of the embodiment of FIG. 14.
Figure 16:
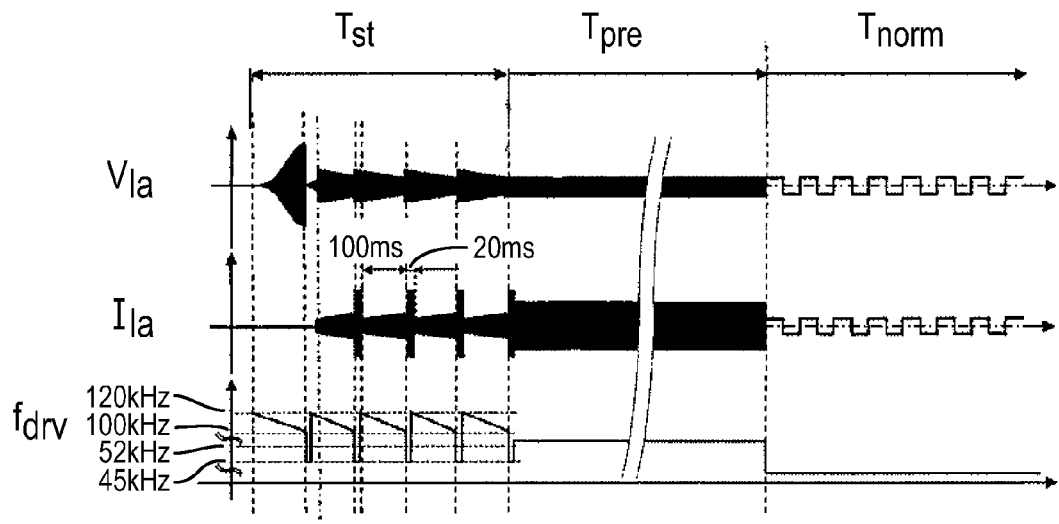
FIG. 16 is a graphical diagram showing another alternative operation of the embodiment of FIG. 14.

With reference to FIGS. 14 to 16, alternative embodiments of a control operation of the present invention may now be described. FIG. 14 shows a voltage Vla applied to the high pressure discharge lamp and a driving frequency fdrv in the inverter circuit when no breakdown occurs in an ignition mode. FIGS. 15 and 16 show a voltage Vla applied to the high pressure discharge lamp, a current Ila flowing in the high pressure discharge lamp, and a driving frequency fdrv in the inverter circuit when a breakdown occurs in the ignition mode. The duration of the ignition mode period is maintained (i.e., for about 1 second) consistent with previously described embodiments, and a transition from the ignition mode sections to the preheating mode is realized when the voltage detection circuit 5 detects ignition of the high pressure discharge lamp by monitoring a lighting state of the high pressure discharge lamp.

In a control example shown in FIG. 15, lighting of the high pressure discharge lamp is detected in about 100 ms in the ignition mode sections, which is immediately followed by transition to the preheating mode to increase a forced current flowing into the high pressure discharge lamp.

A control example in FIG. 16 is also the same as the above example in that lighting of the high pressure discharge lamp is detected in about 100 ms in a period of the ignition mode, but detection is not immediately followed by transition to a preheating mode and the ignition mode periods are maintained for a certain period of time (until after about 600 ms has elapsed in this example) before transition to the preheating mode.

Ignition of the high pressure discharge lamp can also be determined by, in addition to the detection by the voltage detection circuit 5, detecting an increase in a current flowing across the high pressure discharge lamp and an associated light output of the high pressure discharge lamp.

The control operations as shown in FIGS. 14-16 may reasonably be applied to each of the various circuit configurations described herein and shown generally in FIGS. 1-13.

Figure 17:
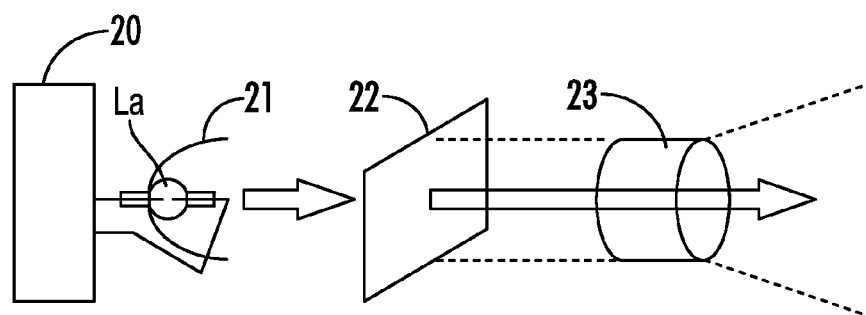
FIG. 17 is a schematic diagram showing a projector using a high pressure discharge lamp ballast according to the present invention.

Referring now to FIG. 17, an image display device or projector including the high pressure discharge lamp La is provided with a reflector 21, the high pressure discharge lamp ballast 20 in accordance with various embodiments such as described herein, an image display element 22 for displaying an image, an optical system 23 for condensing light output from the image display element 22 for projection onto a screen, and a case (not shown) for storing these configuration elements. The image display element 22 may be of a transmission type and/or a reflection type.

Figure 18A:
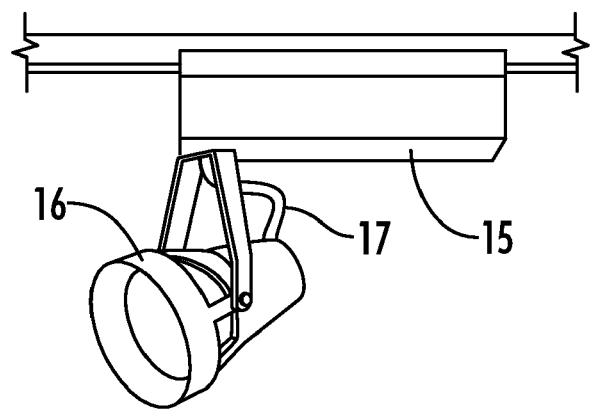
FIGS. 18a-18c are perspective views showing an illumination fixture using the high pressure discharge lamp ballast according to the present invention.
Figure 18B:
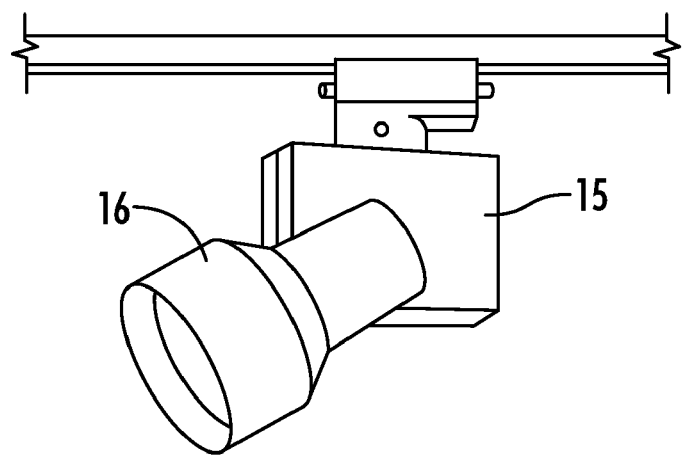
Figure 18C:
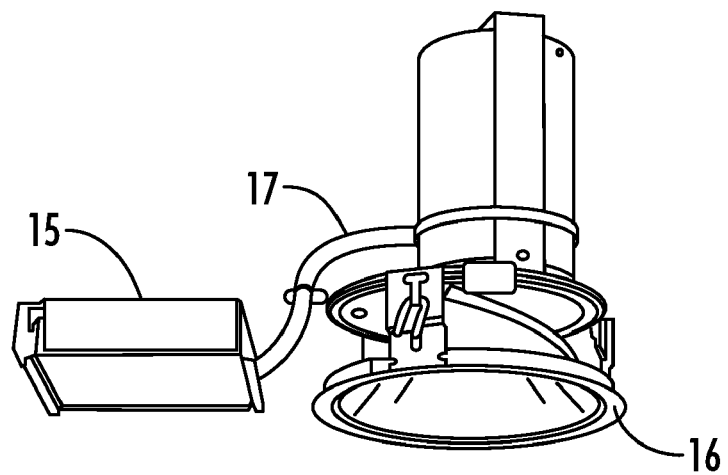
Figure 19:
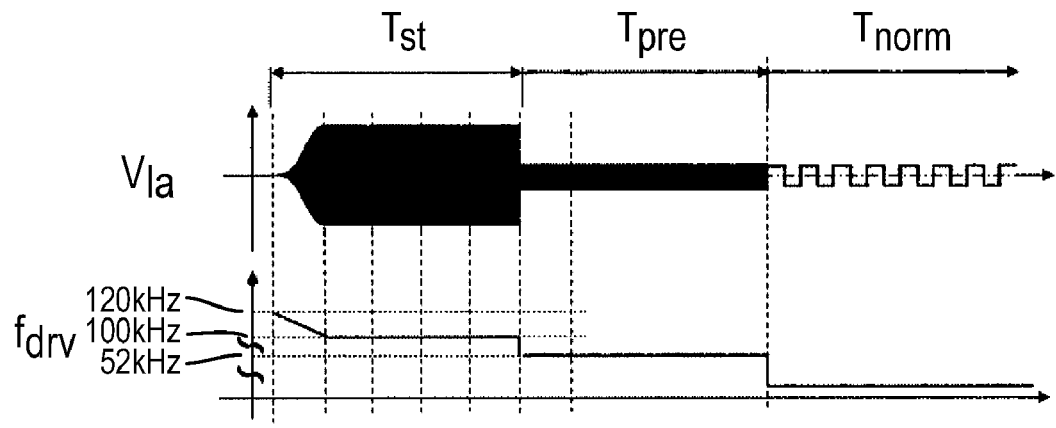
FIG. 19 is a graphical diagram showing operation of a lamp ballast operation as previously known in the art.
Figure 20:
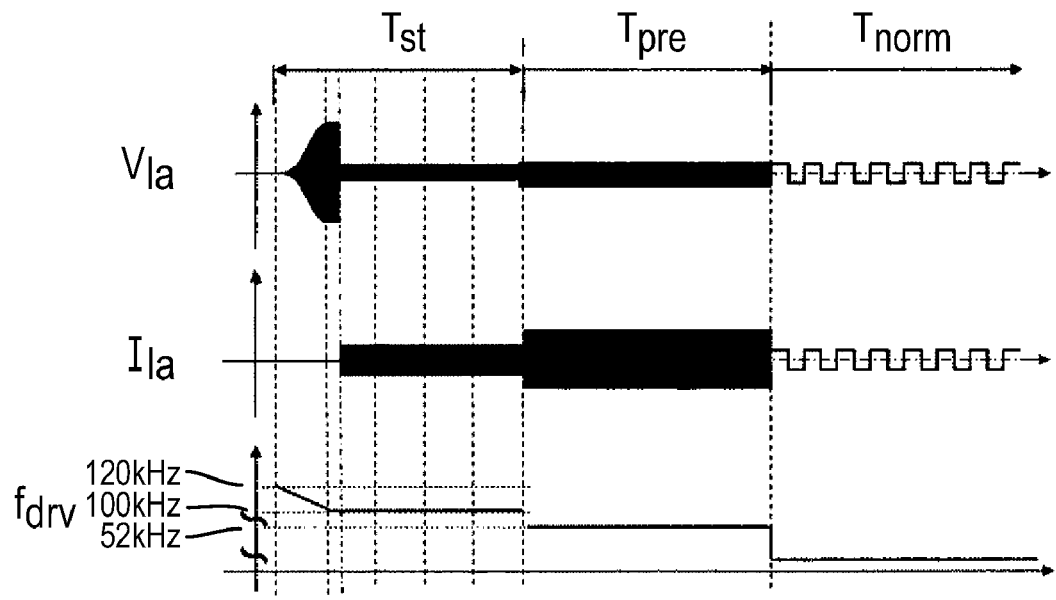
FIG. 20 is a graphical diagram showing another operation as previously known in the art.
Figure 21:
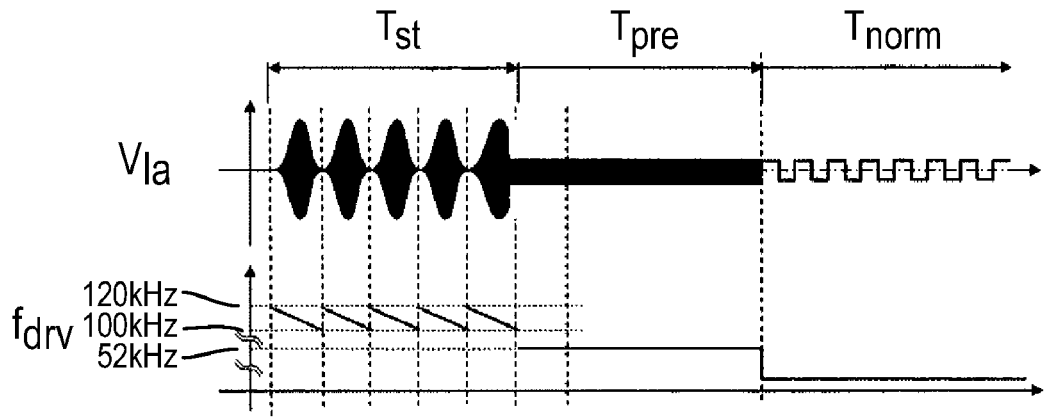
FIG. 21 is a graphical diagram showing another operation as previously known in the art.
Figure 22:
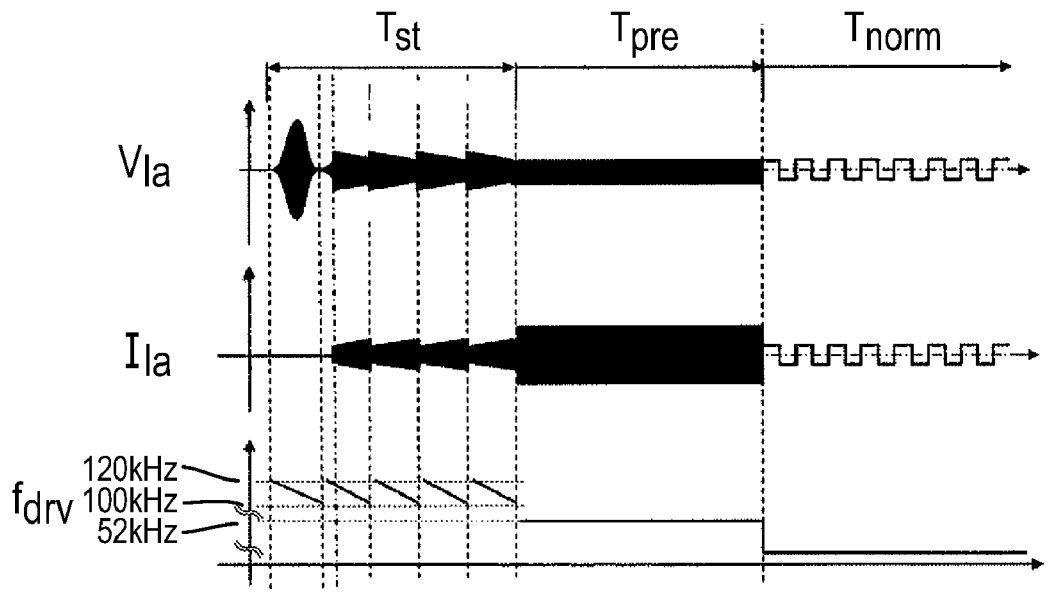
FIG. 22 is a graphical diagram showing another operation as previously known in the art.

FIGS. 18a to 18c show examples of an illumination fixture using the high pressure discharge lamp ballast according to various embodiments of the present invention. Shown in each of FIG. 18a and FIG. 18b is a fixture corresponding to a track light in which a high pressure discharge lamp may be used for a spotlight, and FIG. 18c shows an example using a high pressure discharge lamp for a downlight, wherein 15 refers to an electronic ballast housing for storing associated circuitry of the lamp ballast, 16 refers to a lamp body for mounting a high pressure discharge lamp, and 17 refers to a wiring. A plurality of these illumination fixtures may also be provided in combinations to construct an illumination system. Using the high pressure discharge lamp ballasts according to various embodiments as the present invention will make it possible to provide an illumination fixture capable of ensuring stable lighting of a high pressure discharge lamp and substantially preventing undesired extinguishing of the lamp.

Thus, although there have been described particular embodiments of the present invention of a new and useful Startup Control Method for a High Pressure Discharge Lamp Ballast, it is not intended that such references be construed as limitations upon the scope of this invention except as set forth in the following claims.

What is claimed is:

1. A high pressure discharge lamp ballast comprising:
   an inverter having a plurality of switching elements and an output coupled to a high pressure discharge lamp;
   a series resonant circuit coupled to the inverter output and to the high pressure discharge lamp, the series resonant circuit comprising a resonant capacitor and a resonant inductor, the resonant inductor further comprising an autotransformer having a primary winding, a secondary winding and a center tap, the resonant capacitor coupled to the center tap, the primary winding coupled between two of the plurality of switching elements, and the secondary winding coupled to the lamp and
   a control circuit coupled to the switching elements, the control circuit functional to operate in
      an ignition mode having one or more time periods during each of which a control operation is performed comprising sweeping a driving frequency of the switching elements through a predetermined range of frequencies and then controlling the switching elements at a first driving frequency less than the predetermined range of frequencies, and in
      a preheating mode wherein the switching elements are controlled at a second driving frequency less than the predetermined range of frequencies.

2. The ballast of claim 1, wherein the predetermined range of frequencies includes a resonant frequency associated with the series resonant circuit.

3. The ballast of claim 1, wherein the predetermined range of frequencies approaches a resonant frequency associated with the series resonant circuit multiplied by $[1/(2n+1)]$, where n is a whole number.

4. The ballast of claim 1, wherein the first driving frequency is lower than or equal to the second driving frequency.

5. The ballast of claim 1, wherein the control circuit transitions to the preheating mode after a predetermined period of time associated with the ignition mode elapses.

6. The ballast of claim 1, further comprising a lighting detection circuit functional to detect lamp ignition, wherein the control circuit transitions to the preheating mode immediately after detection by the lighting detection circuit that the lamp has ignited.

7. The ballast of claim 1, the inverter further comprising first and second pairs of switching elements disposed in a full bridge configuration, wherein the control circuit controls the switching elements in the ignition mode at a frequency which fluctuates with respect to time to include a resonant frequency associated with the series resonant circuit, and wherein the control circuit in the preheating mode controls the first pair of switches at a high driving frequency and the second pair of switches at a relatively low driving frequency, wherein a rectangular wave voltage is provided across the lamp.

8. The ballast of claim 7, wherein the control circuit controls the switching elements in the ignition mode at a frequency which fluctuates with respect to time to include a resonant frequency associated with the series resonant circuit multiplied by $[1/(2n+1)]$, where n is a whole number.

9. A high pressure discharge lamp ballast comprising:
a DC power source;
an inverter circuit comprising a pair of switching elements coupled in a half bridge configuration across the DC power source and a series circuit of first and second capacitors coupled in parallel across the pair of switching elements;
a series resonant circuit comprising a third capacitor as a resonant capacitor and an autotransformer as a resonant inductor, the autotransformer having a primary winding, a secondary winding and a center tap, the resonant capacitor coupled to the center tap, the primary winding coupled between the switches in the inverter circuit, and the secondary winding coupled to a first end of a high pressure discharge lamp, the high pressure discharge lamp coupled on a second end between the first and second capacitors of the inverter circuit;
a control circuit configured to control a driving frequency in the inverter circuit, the control circuit operable
in an ignition mode causing the inverter circuit to apply a high frequency voltage to the high pressure discharge lamp,
in a preheating mode preheating one or more lamp filaments after performing the ignition mode, and
in a normal lighting mode applying a low-frequency rectangular wave voltage to the high pressure discharge lamp for continuous generation of arc discharge after performing the preheating mode; and
wherein the ignition mode further comprises one or more time periods during which a control operation is performed, the control operation comprising sweeping a driving frequency of the switching elements through a predetermined range of frequencies, and further during which a first driving frequency equal to or less than a second driving frequency associated with the preheating mode is applied for a period of time.

10. The ballast of claim 9, the DC power source further comprising a rectifier circuit configured to rectify an input voltage from an AC power source into a DC voltage applied to the inverter circuit.

11. A high pressure discharge lamp ballast comprising:
a DC power source;
an inverter circuit comprising
a first pair of switching elements coupled in a half bridge configuration across the DC power source,
a series circuit of first and second capacitors coupled in parallel across the pair of switching elements,
a second pair of switching elements coupled across the series circuit of first and second capacitors, the first and second pairs of switching elements comprising a full bridge inverter circuit, and
a first inductor coupled on a first end between the first and second capacitors and coupled on a second end between the second pair of switching elements;
a series resonant circuit comprising a second inductor and a third capacitor, a high pressure discharge lamp coupled on a first end to the second inductor and on a second to a node between the first and second capacitors;
a control circuit configured to control a driving frequency in the inverter circuit, the control circuit operable
in an ignition mode causing the inverter circuit to apply a high frequency voltage to the high pressure discharge lamp,
in a preheating mode preheating one or more lamp filaments after performing the ignition mode, and
in a normal lighting mode applying a low-frequency rectangular wave voltage to the high pressure discharge lamp for continuous generation of arc discharge after performing the preheating mode:
wherein the ignition mode further comprises one or more time periods during which a control operation is performed, the control operation comprising sweeping a driving frequency of the switching elements through a predetermined range of frequencies, and further during which a first driving frequency equal to or less than a second driving frequency associated with the preheating mode is applied for a period of time.

12. The ballast of claim 11, the second inductor comprising an autotransformer having a primary winding, a secondary winding and a center tap, the third capacitor coupled to the center tap, the primary winding coupled between the first pair of switching elements, and the secondary winding coupled to the lamp.

13. A high pressure discharge lamp ballast comprising:
a DC power source;
an inverter circuit comprising first and second pairs of switching elements coupled in a full bridge configuration across the DC power source, and a series circuit of a first capacitor and a first inductor, the first capacitor coupled between the first pair of switches and the first inductor coupled between the second pair of switches;
a series resonant circuit comprising a second capacitor and a second inductor further comprising an autotransformer having a primary winding, a secondary winding and a center tap, the primary winding coupled between the first pair of switches, the secondary winding coupled to a high pressure discharge lamp, and the center tap coupled to the second capacitor;
a control circuit configured to control a driving frequency in the inverter circuit, the control circuit operable
in an ignition mode causing the inverter circuit to apply a high frequency voltage to the high pressure discharge lamp,
in a preheating mode preheating one or more lamp filaments after performing the ignition mode, and
in a normal lighting mode applying a low-frequency rectangular wave voltage to the high pressure discharge lamp for continuous generation of arc discharge after performing the preheating mode; and
wherein the ignition mode further comprises one or more time periods during which a control operation is performed, the control operation comprising sweeping a driving frequency of the switching elements through a predetermined range of frequencies, and further during which a first driving frequency equal to or less than a second driving frequency associated with the preheating mode is applied for a period of time.

14. A high pressure discharge lamp ballast comprising:
a DC power source:
an inverter circuit further comprising first and second pairs of switching elements coupled in a full bridge configuration across the DC power source;

a series resonant circuit coupled to the inverter circuit and to a high pressure discharge lamp, the resonant circuit comprising a first autotransformer having a primary winding coupled between the first pair of switching elements, a secondary winding coupled to the lamp, and a center tap, a second autotransformer having a primary winding coupled between the second pair of switching elements, a secondary winding coupled to the lamp, and a center tap, and a capacitor coupled to the center tap of the first autotransformer and to the center tap of the second autotransformer;

a control circuit configured to control a driving frequency in the inverter circuit, the control circuit operable in an ignition mode causing the inverter circuit to apply a high frequency voltage to the high pressure discharge lamp, in a preheating mode preheating one or more lamp filaments after performing the ignition mode, and in a normal lighting mode applying a low-frequency rectangular wave voltage to the high pressure discharge lamp for continuous generation of arc discharge after performing the preheating mode; and wherein the ignition mode further comprises one or more time periods during which a control operation is performed, the control operation comprising sweeping a driving frequency of the switching elements through a predetermined range of frequencies, and further during which a first driving frequency equal to or less than a second driving frequency associated with the preheating mode is applied for a period of time.

* * * * *